No. 824,320. PATENTED JUNE 26, 1906.
N. J. H. WEITZMANN.
PROCESS FOR REFINING AND CLEANSING COFFEE.
APPLICATION FILED DEC. 9, 1904.

Witnesses.

Inventor.
Niels Jacob Hermann Weitzmann,
by Harry Orth, atty.

UNITED STATES PATENT OFFICE.

NIELS JACOB HERMANN WEITZMANN, OF MALMOE, SWEDEN.

PROCESS FOR REFINING AND CLEANSING COFFEE.

No. 824,320.  Specification of Letters Patent.  Patented June 26, 1906.

Application filed December 9, 1904. Serial No. 236 231.

*To all whom it may concern:*

Be it known that I, NIELS JACOB HERMANN WEITZMANN, managing director, of No. 12 Lundavägen, Malmoe, in the Kingdom of Sweden, have invented certain new and useful Improvements in Processes for Refining and Cleansing Coffee; and I do hereby declare the following to be a full, clear, and exact description of the invention, such as will enable others skilled in the art to which it appertains to make and use the same.

It is generally supposed that magnetism has no chemical influence upon substances. I have found, however, that a magnetic field has a special influence upon raw coffee-beans, neutralizing the bad taste and smell either due to the beans themselves or due to foreign elements, so that the flavor and strength are increased and the actual quality of the coffee can be readily determined.

The invention can be practically carried out in different ways, dependent upon the quality of the coffee and the quantity to be treated at one time, due regard being paid to the kind of receptacles in which the coffee is packed or shipped.

Figure 1:
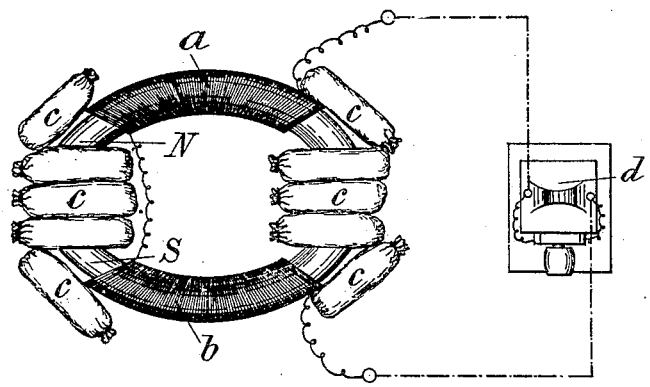
Figure 2:
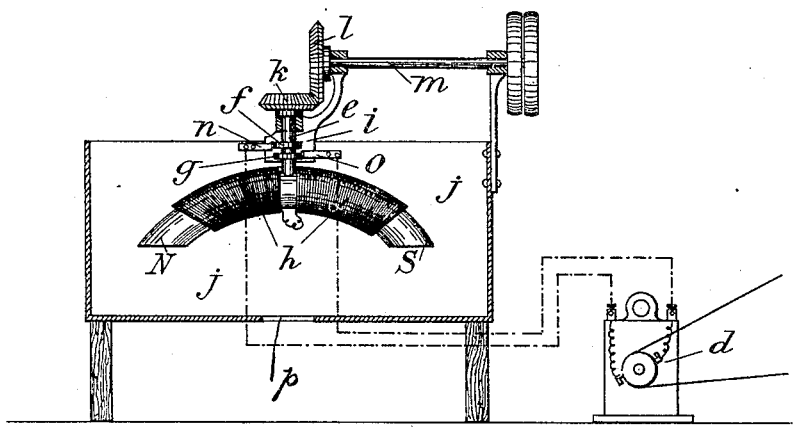

Referring to the drawings, in which like parts are similarly designated, Figure 1 is a plan view of two electromagnets whose coils are connected in series, at the poles of which the coffee in bags is placed. Fig. 2 is an elevation, partly in section, of a device for treating loose coffee.

In Fig. 1, $a$ and $b$ are two electromagnets whose wire coils are connected in series with a suitable source of electric current, as a dynamo $d$.

The sacks of coffee $c$ are placed between and in the vicinity of the poles N and S of the magnets, the interpolar space being increased or diminished to suit the strength of the electric current or the varying conditions, the quality, and the quantity of the coffee to be treated. In this way the result will generally be obtained in from one-half hour to two hours, according to the quality of the coffee treated and the strength of the current used.

In the form of apparatus shown in Fig. 1 the parts are stationary during treatment.

In Fig. 2 I have shown an electromagnet N S, provided with its coil $h$ and a vertical spindle $e$, the latter having two contact-rings $f$ and $g$, to which the ends of the coil $h$ are respectively connected. The spindle $e$ is mounted in bracket $i$ and carries a miter-wheel $k$, meshing with and driven by the miter-wheel $l$ on a driven shaft $m$. The brushes $n$ and $o$ slide on the rings $f$ and $g$, respectively, and are connected to the source of current or dynamo $d$.

The electromagnet N S rotates in bracket $i$ on the tank or receptacle $j$. The loose coffee is placed in said receptacle $j$ below the magnet, so that during the rotation of the latter the magnetic field will more equally affect the beans. The loose coffee may be stirred during the treatment to bring all the beans within the strongest part of the magnetic field and be discharged through a central aperture $p$ in the bottom of the receptacle.

I claim—

1. The process of treating coffee, which consists in subjecting the coffee to the action of magnetism.

2. A process of treating coffee, consisting in producing a magnetic field and passing the coffee through said field.

3. A process of refining and cleansing coffee, consisting in producing a powerful magnetic field, passing the coffee through said field and agitating the coffee during its passage through said field.

In testimony that I claim the foregoing as my invention I have signed my name in presence of two subscribing witnesses.

NIELS JACOB HERMANN WEITZMANN.

Witnesses:
 HOFMAN DAVY COLE,
 ALBERT G. MICHELSON.